United States Patent [19]

Williams et al.

[11] 4,110,833
[45] Aug. 29, 1978

[54] BALANCED AC CORRELATOR SYSTEM

[75] Inventors: Mark R. Williams, West Melbourne; Gayle Patrick Martin, Indialantic, both of Fla.

[73] Assignee: The United States of America as represented by the Secretary of the Air Force, Washington, D.C.

[21] Appl. No.: 743,361

[22] Filed: Nov. 19, 1976

[51] Int. Cl.² ............................ G06G 7/19; H04B 1/12
[52] U.S. Cl. .................................. 364/819; 325/476; 328/160; 364/574
[58] Field of Search ................ 235/181, 194; 328/160, 328/167; 325/474–477; 364/819, 574

[56] References Cited

U.S. PATENT DOCUMENTS

| 2,914,762 | 11/1959 | Gross et al. | 235/181 |
| 3,737,686 | 6/1973 | Swanekamp et al. | 235/194 |
| 3,867,620 | 2/1975 | Coor | 235/181 |
| 3,982,114 | 9/1976 | Hook | 235/181 |

Primary Examiner—Felix D. Gruber
Attorney, Agent, or Firm—Joseph E. Rusz; Henry S. Miller

[57] ABSTRACT

A system having a pair of input signals, one of which is modulated and transformed into a pair of signals phased 180° apart. These signals are acted on by a FET correlator where the second input signal controls the FET gate. Correlator output is amplified and a blocking capacitor removes DC offset, a synchronous switch operated at the modulated frequency converts the remaining AC to DC which is amplified to the output.

4 Claims, 2 Drawing Figures

BALANCED AC CORRELATOR SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to electronic signal processing systems and more particularly to a balanced AC correlation system using field effect transistors.

Antenna and antenna array systems as well as acoustical sensing systems and other similar systems have input signals that may be weak, distorted or interfered with. These require electronic systems that are capable of distinguishing a desired signal from a quantity of other signals of various quality. In order to accomplish this result, the electronic processing system in the receiver must be of the highest possible sensitivity and reliability.

A common difficulty that arises with these sensitive systems is the influence of extraneous DC voltages that are generated in the system and which may be temperature dependent or otherwise dependent on factors not clearly defined. These voltages are referred to as offset voltages. Devices having low offset voltages are difficult in design and very nearly impossible to manufacture. The invention presented herein seeks to overcome the disadvantages of the prior art.

SUMMARY OF THE INVENTION

The invention involves a system with very low offset voltages which will correlate two signals giving a DC output corresponding to their phase relationship. The low offsets are obtained by using balanced junction field effect transistor correlation with modulation of one input signal to yield an AC correlation product which is then converted to DC. This is distinguishable from other known systems which utilizes direct DC correlation with mixers.

The system of the invention utilizes a first signal which is modulated by a given amount. This signal is then transformed into two balanced signals 180° out of phase and fed to the source and drain leads of a junction field effect transistor correlator. A second input signal is applied to the gate of the transistor which causes the junction field effect transistor to act as a multiplier, with the product being the modulation factor which in turn varies in amplitude as the amplitude and phase relationship of the two signals vary.

The output of the correlator is amplified and the DC products causing offset are eliminated by a blocking capacitor. DC conversions for the desired signal is produced by a synchronous switch, operated at the same rate as the modulation frequency, combined with a low pass filter. The final product is DC amplified to produce an appropriate output.

It is therefore an object of the invention to provide a new and improved balanced AC correlation system.

It is another object of the invention to provide a new and improved balanced AC correlation system that utilizes a junction field effect transistor processing system.

It is a further object of the invention to provide a new and improved balanced AC correlation system with low offset voltages.

It is still another object of the invention to provide a new and improved balanced AC correlation system that is low in cost and more easily manufactured than similar known systems.

It is still another object of the invention to provide a new and improved balanced AC correlation system that is highly sensitive and more reliable than other systems of a like nature.

These and other advantages, features and objects of the invention will become more apparent from the following description taken in connection with the illustrative embodiment in the accompanying drawing.

DESCRIPTION OF THE DRAWING

The FIG. 1 is a block diagram of the invention.

DESCRIPTION OF THE PREFERRED EMBODIMENT

Figure 1:
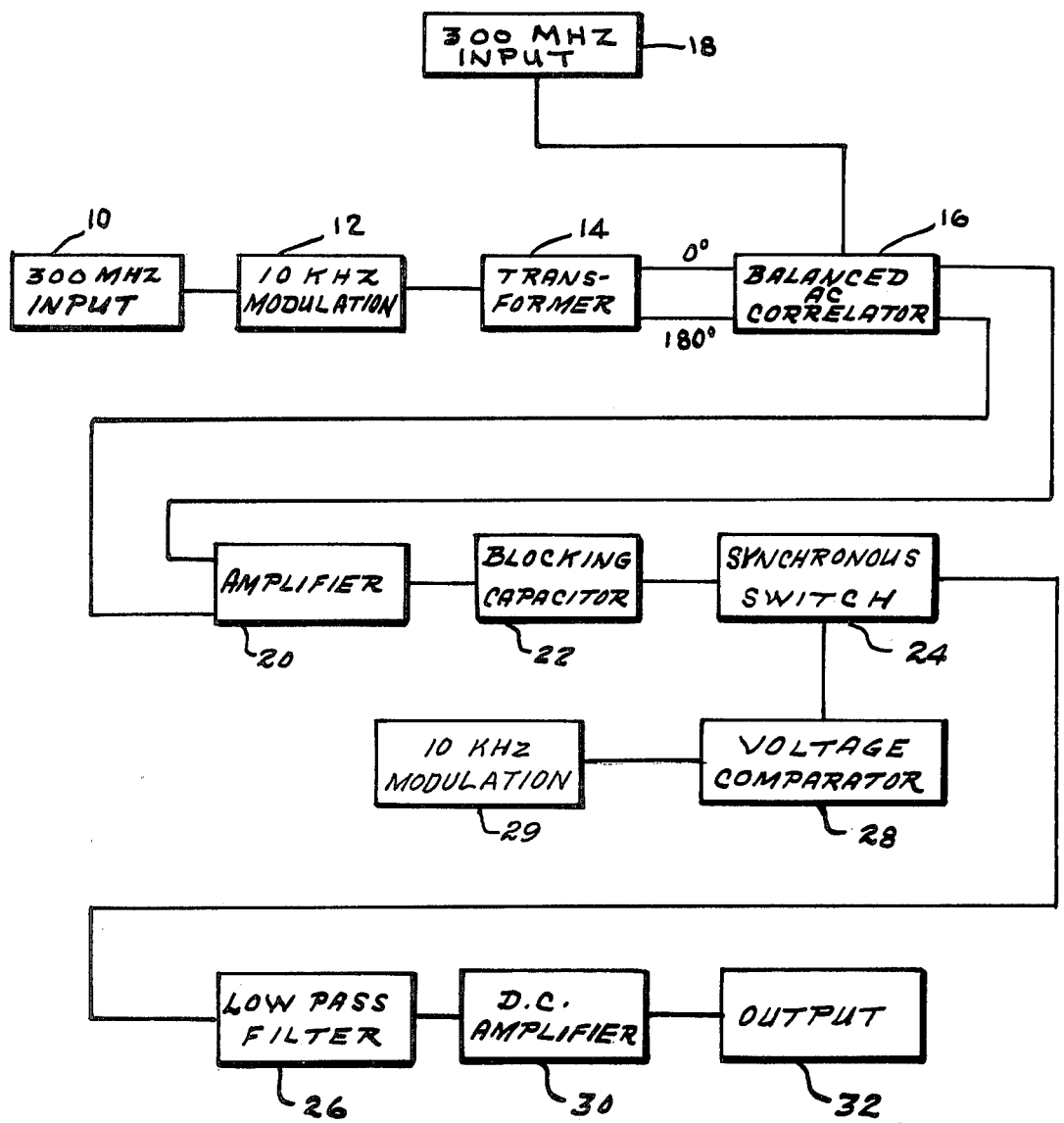
Figure 2:
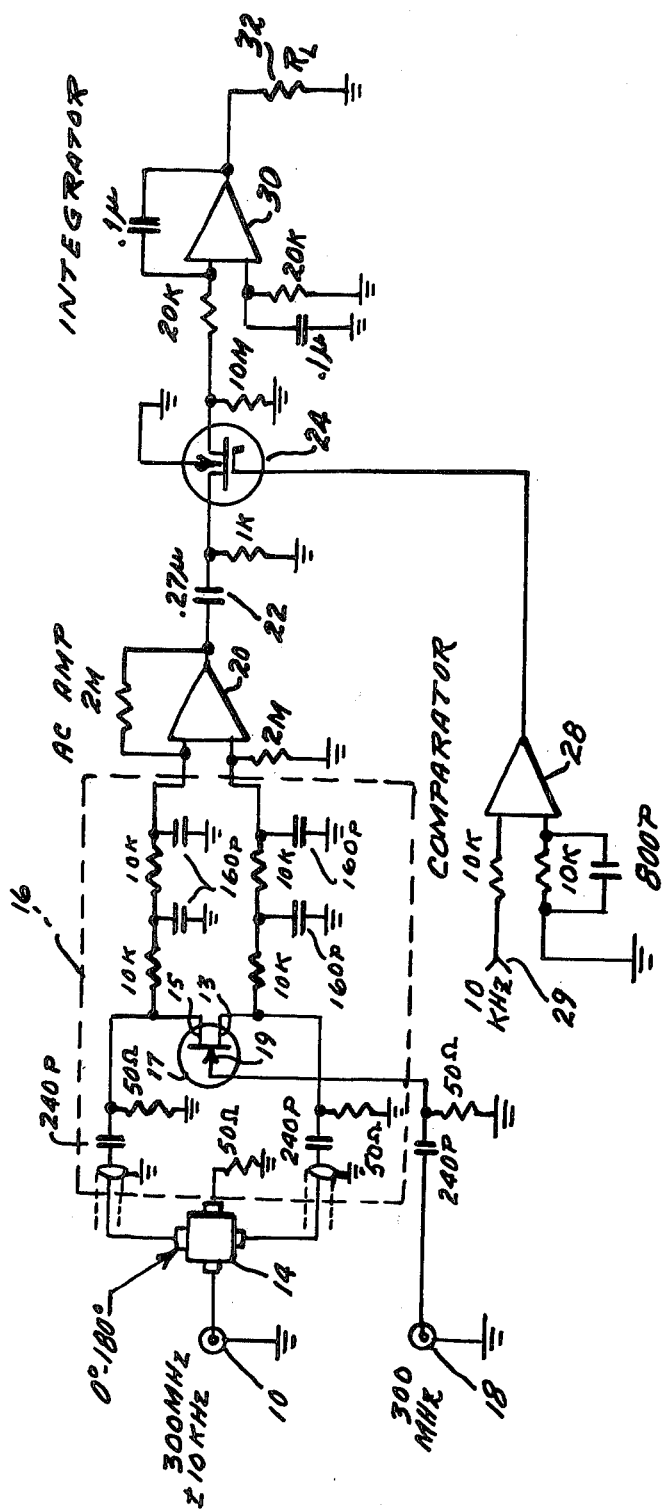
FIG. 2 is a circuit diagram of the invention.

Referring now to FIGS. 1 and 2, an input signal source, for example, 300 MHz is shown at 10. This signal is modulated by 10 KHz at 12 and transformed at 14 into two balanced signals 180° out of phase. The balanced signals are fed to the source 13 and drain 15 terminals of a junction field effect transistor 17 of the correlator 16. A second 300 MHz input signal 18 is applied to the gate 19 of the junction field effect transistor hence, operation is at a very low level where the device exhibits nearly square law characteristics. The transistor then acts as a multiplier with the product being the 10 KHz modulation which varies in amplitude as the amplitude and phase relationship of the two signals vary.

The AC signals leaving the correlator are amplified by a balanced low noise audio amplifier 20. The balance arrangement reduces noise common to the system. Since the amplification is done AC, the DC products which would cause offset as well as offsets of the amplifier are eliminated by the blocking capacitor 22. Amplification of this state should be great enough to cause any offsets from the components following to be insignificant except at very low signal levels. Hence, very low error correlation products can be obtained over a larger dynamic range than with direct DC correlation as is presently known in the art.

The 10 KHz correlation signal will occur when the correlated signals are in phase and a null will occur when they are 90° out of phase. If the phase difference exceeds 90°, the 10 KHz waveform amplitude will pass through the null and again increase, only 180° out of phase. This phase reversal must be maintained to cover phase differences from 0° to 180° in the two correlated signals. Therefore, the DC conversion mechanism is a synchronous switch 24, operated at the same 10 KHz rate as the correlation signal, and an active low pass filter 26. A voltage comparator 28 is added to ensure that a good switching waveform from 10 KHz modulation source 29 is applied to the gate of synchronous switch 24. The DC voltage from low pass filter 26 is further amplified at 30 to provide a strong usable signal to the output 32.

Although the invention has been described with reference to a particular embodiment, it will be understood to those skilled in the art that the invention is capable of a variety of alternative embodiments within the spirit and scope of the appended claims.

What is claimed is:

1. A balanced AC correlation system comprising: a first and second signal input means; modulator means connected to said first input means for modulating a signal; means connected to said modulator means for establishing two balanced signals; correlator means adapted to receive said balanced signals and said second input signal whereby said second input signal causes said balanced signals to vary in amplitude; amplifier means for amplifying the output of the correlator means; means for inhibiting the flow of a direct current signal from the amplifying means; switch means connected to the said means for inhibiting for causing a change in signal from AC to DC; filter means connected to the switch means for enhancing the quality of the DC signal, and means for amplifying the DC output signal.

2. A balanced AC correlation system according to claim 1 wherein said means for inhibiting is a blocking capacitor.

3. A balanced AC correlation system according to claim 1 including, a voltage comparator connected to said switch for improving switching waveform.

4. A balanced AC correlation system according to claim 1 wherein, said correlator includes a junction field effect transistor having said balanced signals connected to the source and drain terminals and said second input signal connected to the gate terminal.

* * * * *